(12) United States Patent
Liverman et al.

(10) Patent No.: US 7,240,406 B1
(45) Date of Patent: Jul. 10, 2007

(54) SECURITY IMPROVEMENT FOR PACKAGE FASTENING CLIPS

(75) Inventors: Ivan Neil Liverman, Middlesex, NC (US); Mark Edmund Maresh, Phoenix, AZ (US); Eric Allen Stegner, Durham, NC (US); Robert William Stegner, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/279,616

(22) Filed: Apr. 13, 2006

(51) Int. Cl.
*A44B 17/00* (2006.01)
(52) U.S. Cl. .................................................. 24/614
(58) Field of Classification Search ............. 24/651, 24/652, 618, 625, 666, 604, 662; 292/17, 292/218, 68, 145, 150, 156; 439/535; 200/51 R; 174/55, 53
See application file for complete search history.

(56) References Cited

U.S. PATENT DOCUMENTS

| | | | |
|---|---|---|---|
| 2,946,612 A | 7/1960 | Ahlgren |
| 3,890,680 A | 6/1975 | Furuya |
| 4,407,413 A | 10/1983 | Jansson |
| 4,977,650 A | 12/1990 | Ida |
| 5,103,538 A | 4/1992 | Ryder |
| 5,412,848 A | 5/1995 | Precourt |
| 5,702,135 A | 12/1997 | Burress |
| 6,230,965 B1 | 5/2001 | Dismukes |
| 6,253,826 B1 | 7/2001 | Witter et al. |
| 6,412,153 B1 | 7/2002 | Khachadourian et al. |

*Primary Examiner*—Alexander Gilman
(74) *Attorney, Agent, or Firm*—Daniel E. McConnell; Gregory M. Doudnikoff

(57) ABSTRACT

A package fastening clip having enhanced security of engagement with packaging materials by the provision of at least three material engaging legs, one of which cooperates with a latch member to secure the clip in assembled position.

10 Claims, 3 Drawing Sheets

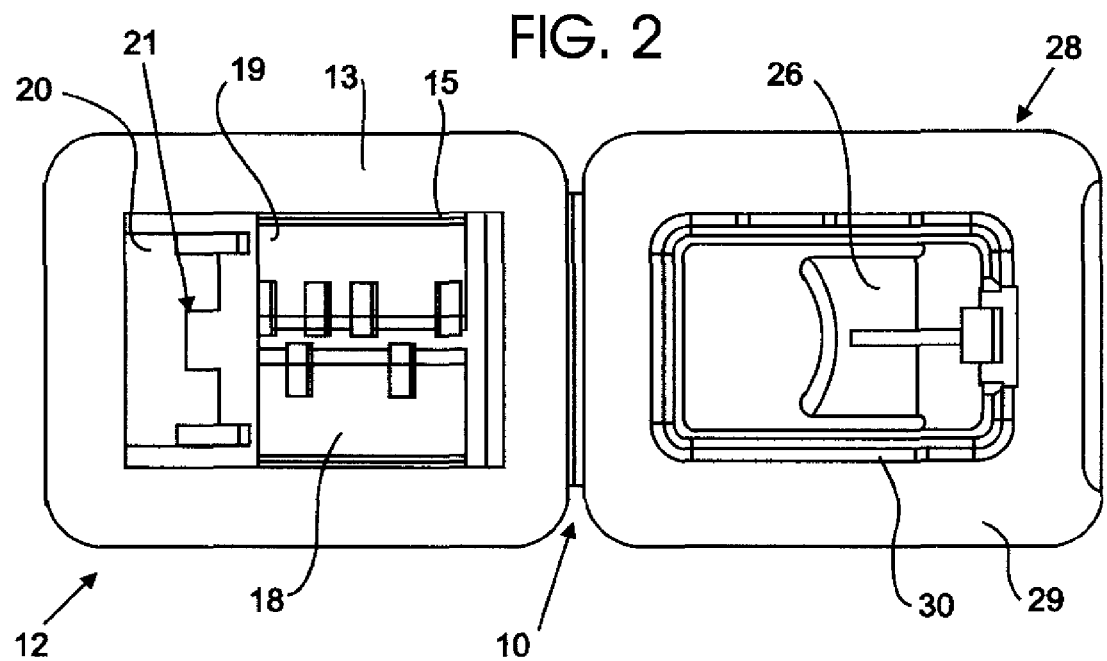
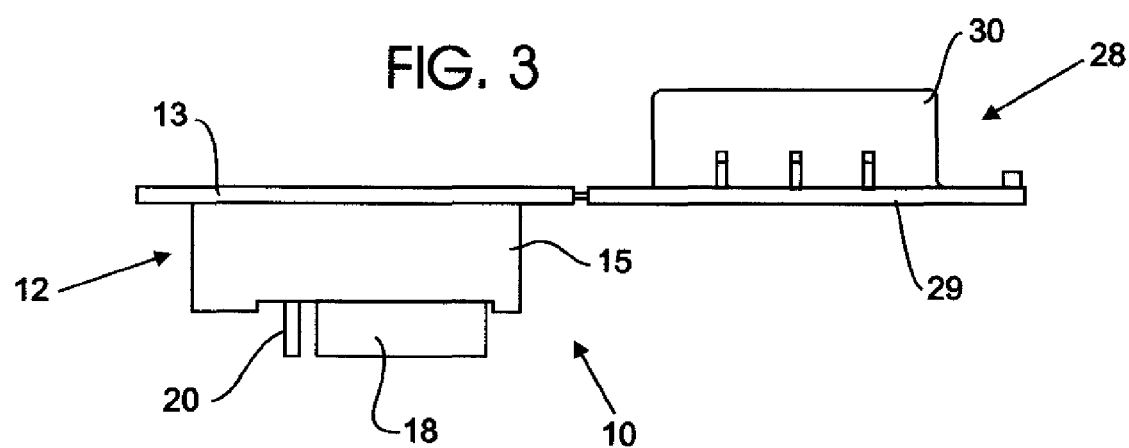

SECURITY IMPROVEMENT FOR PACKAGE FASTENING CLIPS

FIELD AND BACKGROUND OF INVENTION

This invention relates to fastener clips for product packaging. In particular, this invention is an improvement over the clip shown and described in Khachadourian et al U.S. Pat. No. 6,412,153, owned in common with the invention described here and hereby incorporated by reference into this disclosure.

As the prior art clip has been widely and successfully used, the size and weight of electronic systems packaged using such clips has increased. That increase in loading, together with experience with rough handling of the packaged products in shipment, has demonstrated that in some circumstances a clip may be twisted in place or impacted or pried and become loose in its engagement with the packaging or unlatched. Such disruption of assembly of the packaging is undesirable as potentially exposing the packaged product to access.

SUMMARY OF THE INVENTION

The present invention provides a clip which is more securely engaged with a package in which it is installed and thus significantly less likely to become loose or disengaged in handling of the packaged product. Accordingly, one purpose of this invention is to enhance the engagement and latching of a clip apparatus with packaging materials into which it is inserted as a locked assembly.

BRIEF DESCRIPTION OF DRAWINGS

Some of the purposes of the invention having been stated, others will appear as the description proceeds, when taken in connection with the accompanying drawings, in which:

FIG. 2 is a plan view of the clip of FIG. 1;

FIG. 3 is a side elevation view of the clip of FIGS. 1 and 2;

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
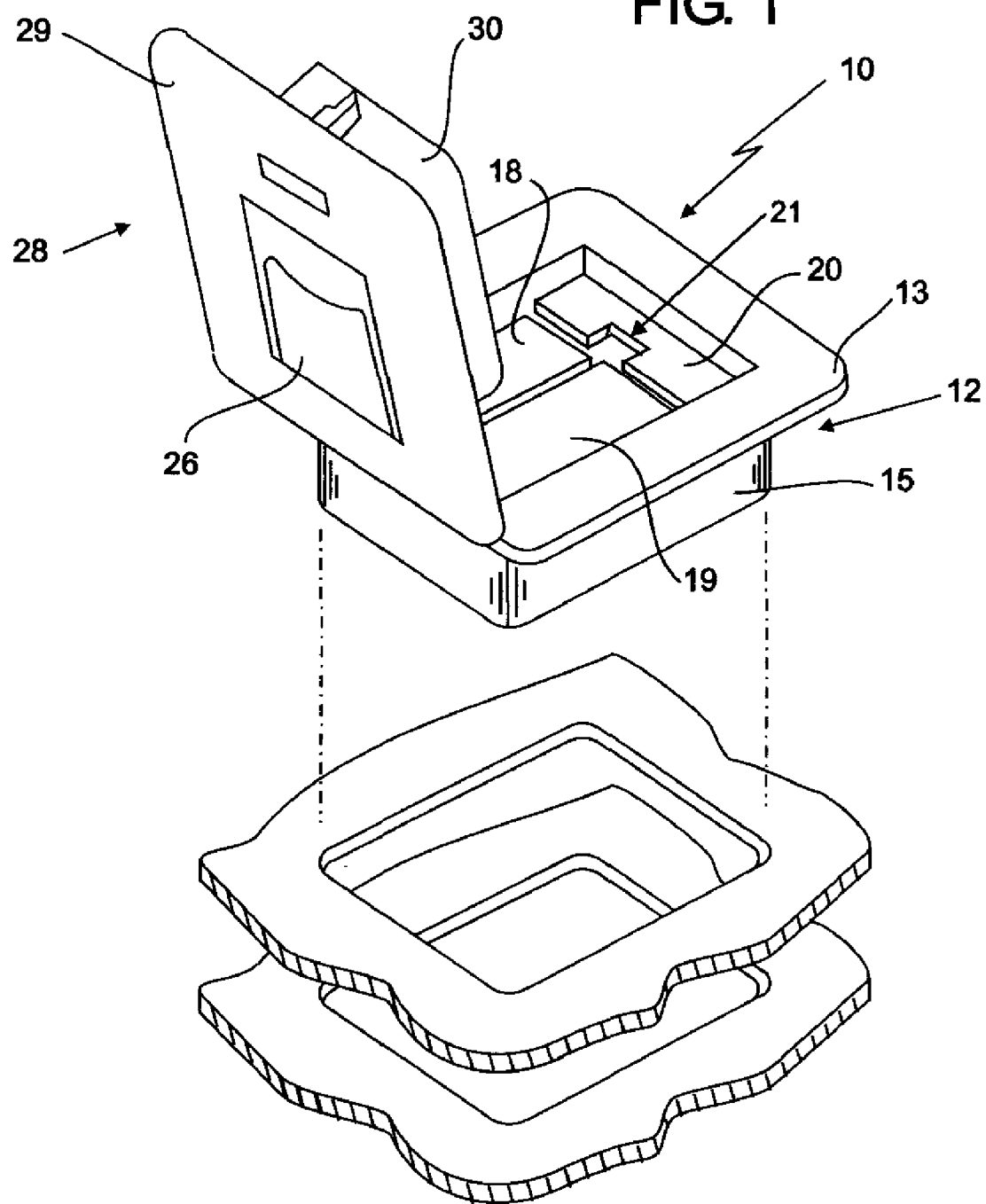
FIG. 1 is a view similar to FIG. 2 of U.S. Pat. No. 6,412,153 showing a first embodiment of the clip in accordance with this invention and a portion of a product package.

Referring now to FIGS. 1 through 3, an apparatus 10 is there shown which is an improvement over the clip of the prior patent incorporated by reference into this disclosure by the provision of at least three leg portions. More particularly, the apparatus has a socket body 12 having a planar portion 13, a thin walled protuberance 15 formed integrally with the planar portion and three leg portions 18, 19, 20 formed integrally with the protuberance 15 and hingedly connected thereto at an end location remote from the planar portion. This structure corresponds generally to that shown in the prior patent with the exception of the addition of the third leg portion. The provision of three leg portions, in this first embodiment according to this invention, assures that engagement of the clip with packaging materials is more secure against rotation or prying loose resulting from impact or other damage during handling. One of the leg portions 19 defines an opening 21 which, as described hereinafter, receives the latch member of the plug body. This arrangement provides a biased engagement between the latch and the leg which is more secure than the prior arrangement in which the latch engages a ledge.

The apparatus 10 has a plug body 28 having a planar portion 29, a thin walled protuberance 30 formed integrally with the planar portion and configured to enter into the socket body, and a latch member 26 formed integrally with and hingedly connected to the planar portion 29. As with the device of the disclosure here incorporated by reference, the plug body protuberance engages the socket body leg portions upon insertion into the socket body, rotating the leg portions to extend outwardly from the socket body protuberance and lock together two pieces of a product package into which the apparatus is inserted. In distinction, as mentioned above, the insertion of the plug body causes three legs to be pivoted outwardly, engaging the inner sheet of cardboard over a larger area and providing enhanced resistance to tear out or rotation of the clip.

In accordance with an important feature of this invention, the latch member 26 is held in the assembled or locked position by engagement with the opening 21 defined in one leg 19. Thus, there is a bias exerted by the outwardly pivoted leg against disengagement of the latch. While this may require a greater effort for disassembly of the package, the benefit lies in greater resistance to accidental opening of the packaging.

The present invention contemplates that the socket and plug bodies may be formed integrally one with the other as in the case of the prior patent disclosure. In this case, the bodies are hingedly connected along one side edge of the planar portions, as shown.

Figure 4:
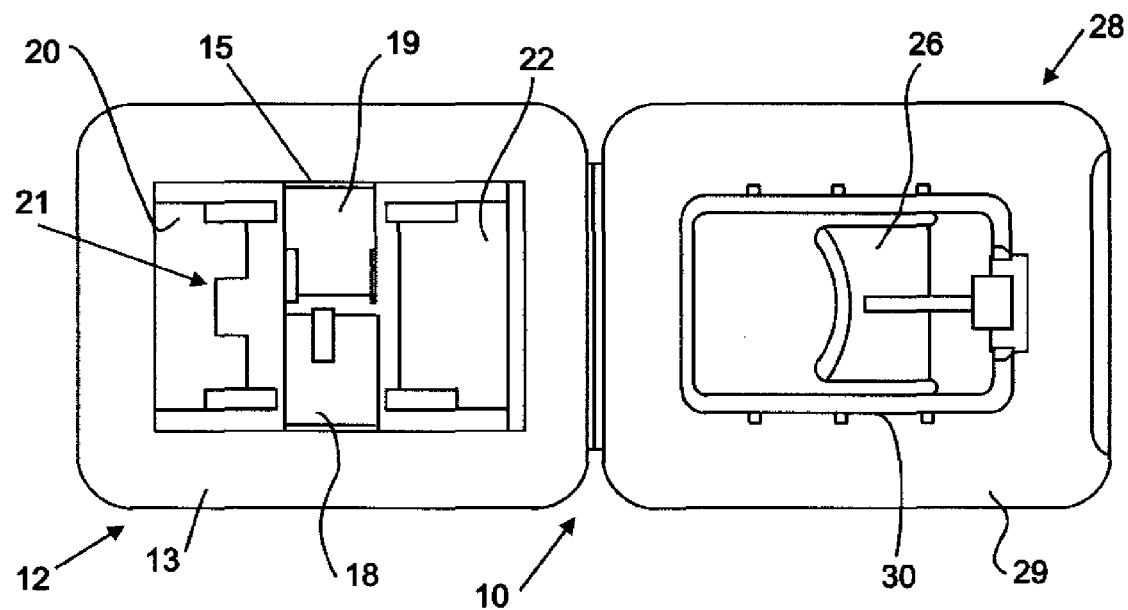
FIG. 4 is a plan view of a second embodiment of clip in accordance with this invention.
Figure 5:
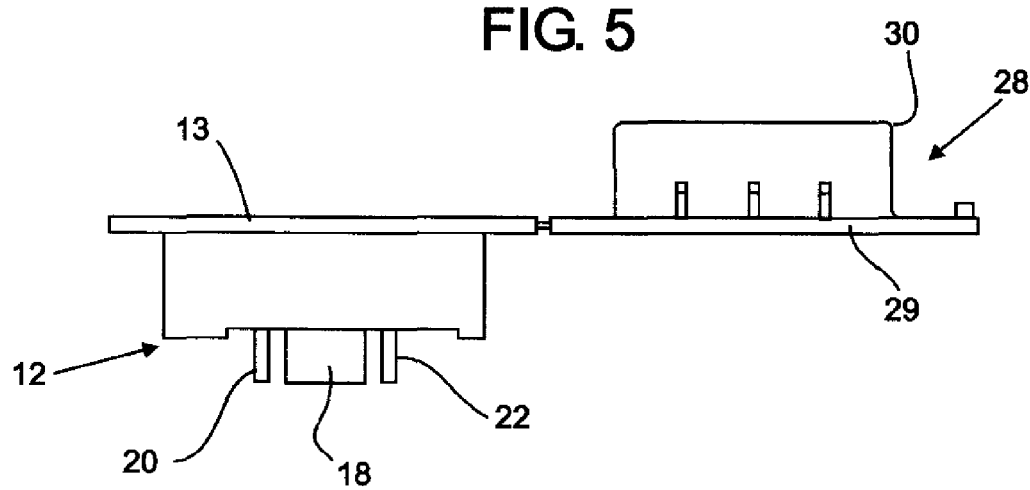
FIG. 5 is a side elevation view of the clip of FIG. 4.

The present invention also contemplates that the socket body may be provided with four legs in order to still further expand the areas of engagement with the packaging materials. Such an embodiment is shown in FIGS. 4 and 5, where reference characters as used in FIGS. 1 through 3 are applied with the addition of the fourth leg 22.

In the drawings and specifications there has been set forth a preferred embodiment of the invention and, although specific terms are used, the description thus given uses terminology in a generic and descriptive sense only and not for purposes of limitation.

What is claimed is:

1. Apparatus comprising:
   a socket body having a planar portion, a thin walled protuberance formed integrally with said planar portion and three leg portions formed integrally with said protuberance and hingedly connected thereto at an end location remote from said planar portion;
   one of said leg portions defining a latching point opening; and
   a plug body having a planar portion, a thin walled protuberance formed integrally with said planar portion and configured to enter into the socket body, and a latch member formed integrally with and hingedly connected to said planar portion;

said plug body protuberance engaging said socket body leg portions upon insertion into said socket body and rotating said leg portions to extend outwardly from said socket body protuberance;

said latch member engaging said latching point opening upon insertion into said socket body and securing said socket body and said plug body together.

2. Apparatus according to claim 1 wherein said socket body and said plug body are formed integrally together and hingedly connected along a common side edge thereof.

3. Apparatus according to claim 1 wherein said socket body has four leg portions.

4. Apparatus according to claim 1 wherein said socket body thin wall protuberance has a cross section taken parallel to said socket body planar portion which is polygonal.

5. Apparatus according to claim 4 wherein said socket body thin wall protuberance has a cross section taken parallel to said socket body planar portion which is rectangular.

6. Apparatus comprising:

first and second sheets of planar material forming portions of a product package; and a fastener penetrating said sheets and holding said sheets together, said fastener comprising:

a socket body having a planar portion, a thin walled protuberance formed integrally with said planar portion and penetrating said sheets and three leg portions formed integrally with said protuberance and hingedly connected thereto at an end location remote from said planar portion;

one of said leg portions defining a latching point opening;

said leg portions being rotated to extend outwardly from said socket body protuberance to capture said sheets between said socket body planar portion and said legs; and a plug body having a planar portion, a thin walled protuberance formed integrally with said planar portion and configured to enter into the socket body, and a latch member formed integrally with and hingedly connected to said planar portion;

said latch member engaging said latching point opening in said one leg portion.

7. Apparatus according to claim 6 wherein said socket body and said plug body are formed integrally together and hingedly connected along a common side edge thereof.

8. Apparatus according to claim 6 wherein said socket body thin wall protuberance has a cross section taken parallel to said socket body planar portion which is polygonal.

9. Apparatus according to claim 6 wherein said socket body thin wall protuberance has a cross section taken parallel to said socket body planar portion which is rectangular.

10. Apparatus according to claim 6 wherein said socket body has four leg portions.

* * * * *